(12) United States Patent
White et al.

(10) Patent No.: US 6,582,612 B1
(45) Date of Patent: Jun. 24, 2003

(54) PLANKTON MITIGATION SYSTEM

(75) Inventors: Theodore Baxter White, Ladysmith (CA); Christopher Todd Macey, Port Coquitlam (CA)

(73) Assignee: Future Sea Technologies Inc., Nanaimo (CA)

( * ) Notice: Subject to any disclaimer, the term of this patent is extended or adjusted under 35 U.S.C. 154(b) by 196 days.

(21) Appl. No.: 09/731,283

(22) Filed: Dec. 7, 2000

(51) Int. Cl.[7] .............................. C02F 1/00; C02F 7/00; A01K 61/00
(52) U.S. Cl. .................. 210/747; 210/170; 119/208; 119/215; 119/219; 119/238; 119/239
(58) Field of Search ................................. 210/747, 170; 119/209, 215, 238, 239, 240, 208

(56) References Cited

U.S. PATENT DOCUMENTS 6,062,170 A * 5/2000 Finch et al. ................. 119/215

6,428,711 B1 * 8/2002 Nakamura et al. .......... 210/747

FOREIGN PATENT DOCUMENTS

| GB | 1540970 | 2/1979 |
|----|---------|--------|
| JP | 2001-292659 | 10/2001 |

OTHER PUBLICATIONS

Search Report on Corresponding UK Application 0129109.5 Search Report dated May 27, 2002.

* cited by examiner

Primary Examiner—Robert J. Popovics
(74) Attorney, Agent, or Firm—C. A. Rowley

(57) ABSTRACT

A method of mitigating plankton from fish pens moves denser cleaning water from a selected depth into the pen and discharges it to flow horizontally across the pen, but with a downward component and at a sufficient velocity so that the cleaning water sweeps (carries) the plankton from the pen.

24 Claims, 5 Drawing Sheets

PLANKTON MITIGATION SYSTEM

FIELD OF THE INVENTION

The present invention relates to plankton removal from fish pens, more particularly to an improved system for displacing plankton from fish pens.

BACKGROUND OF THE PRESENT INVENTION

Fish rearing in pen, for example, in open net pens that usually but not exclusively are enclosed by open mesh, are exposed to the conditions prevailing in the water surrounding the pen.

Several undesirable conditions can occur in this water including, but not limited to:

1. Presence of toxic or parasitic plankton (usually algae or sealice).
2. Undesirable water temperature (usually too high).
3. Undesirable oxygen concentrations in the water (usually too low).

In natural bodies of water stratification of the water column can occur. This can lead to a condition where an undesirable condition is present in the upper part of the column but not below a certain depth. Examples of this condition include algal blooms where the significant portion of the bloom is in the euphotic or illuminated part of the column and thermal stratification wherein warmer water overlies colder water with a distinct thermocline between them. Often these phenomena are associated and sometimes linked.

Operators in some areas often use multiple air-lift pumps to provide algae-free water during algal blooms. These pumps are small, so many are required and do not discharge in a radial fashion. In addition, the flow rate achievable is low so that they often fail to provide adequate mitigation. Typically, these pumps would be arranged around the perimeter of a tarped net-pen system discharging in over the tarp.

Applicant is aware of one operator in Chile who has tried a simple vertical pipe with a pump inside it and discharges from the pipe in a substantially vertical direction. The reports have had reports that this strategy was not very successful. We have no data on flow rates so and therefore cannot estimate current or downfield dispersion.

One example of aeration and/or circulating devices is shown in U.S. Pat. No. 5,564,828 issued Oct. 15, 1996 to Haegeman which shows a system that takes water from in the pen moves it vertically and then disperses it with a tangential component to disperse and mix the water in the tank or pen. U.S. Pat. No. 4,350,648 issued Sep. 21, 1982 to Watkins and U.S. Pat. No. 5,110,510 issued May 5, 1992 to Norcross each describe recirculation systems wherein the output is diverted radially and adjustment are provided to control the output and how the water is recirculated, i.e. in Watkins a diffuser cone is connected to a diffuser hood that move together between a mixing position wherein the cone blocks the flow of water through float on which the system is mounted and an aerating position wherein the diffuser hood is positioned against the float and the cone is spaced above the float to divert the water.

U.S. Pat. No. 4,798,168 issued Jan. 17, 1989 to Vadseth et al. describes a system wherein water is pumped (air lifted) from below and injected tangentially into a peripherally closed tank to expel water in the tank through an overflow outlet. This patent does refer to drawing water at a suitable temperature form below, but they are discussing operation in cold temperatures where the water below is at a higher temperature than the water in the tank and they use the higher temperature water from below to raise the temperature in the tank.

BRIEF DESCRIPTION OF THE INVENTION

It is the main object of the invention to provide a system (method) for removing plankton from a fish pen.

Broadly the present invention relates to a method of removing plankton from a fish pen comprising pumping a cleaning water from a depth sufficiently low to provide a source of cleaning water having a density significantly higher than the water density of water in said pen, said pumping delivering higher density cleaning water at a velocity sufficient to distribute said higher density water across at least a major portion of the area of said pen while permitting at least a portion of said higher density water to sink toward a bottom of said pen at a rate to,carry plankton with it and dispensing said plankton carried to said bottom by said cleaning water from said pen.

Preferably said pumping dispenses said cleaning water substantially radially of an outlet without formation of an abrupt downward plume of water at said outlet.

Preferably said pumping dispenses said cleaning water substantially radially of an outlet to form a surface plume that extends over a major portion of the area of the surface of said pen. Preferably said pumping dispenses said cleaning water at a velocity having a component radially of said outlet of between 1 and 3 meters/second.

Preferably said pumping dispenses said cleaning water at a flow rate of between 1 and 2 cubic meters/second.

Preferably said cleaning water in said pen has a downward velocity obtained substantially solely based on turbulence and the difference in density between said cleaning water and said water in said pen.

BRIEF DESCRIPTION OF THE DRAWINGS

Further features, objects and advantageous will be evident from the following detailed description of the preferred embodiments of the present invention taken in conjunction with the accompanying drawings in which.

DETAILED DESCRIPTION OF THE INVENTION

The plankton generally is not killed by a lowering of water temperature and thus, the plankton problem may only be cured by displacing it from the pen. Generally the goal may be expressed in terms of reducing the plankton density as expressed in cells per cubic milliliter (ml). A typical bad bloom might be as high as 10 to the 7 cells/ml. It is difficult to establish a number that is an "acceptable" level as it varies with both fish species and plankton species. With the present invention applied to a pen formed by an enclosed bag with a bottom outlet Applicant has achieved levels of 300–400 cells/ml when the outside was at a level of about $10^7$ cells/ml. This was with very toxic algae and sensitive fish (Atlantic salmon), but with the stated results it was unnecessary to take the fish off feed. Effective mitigation might only be achieved with as little as a tenfold reduction. Success has been reported with as little as a 60% reduction.

Figure 1:
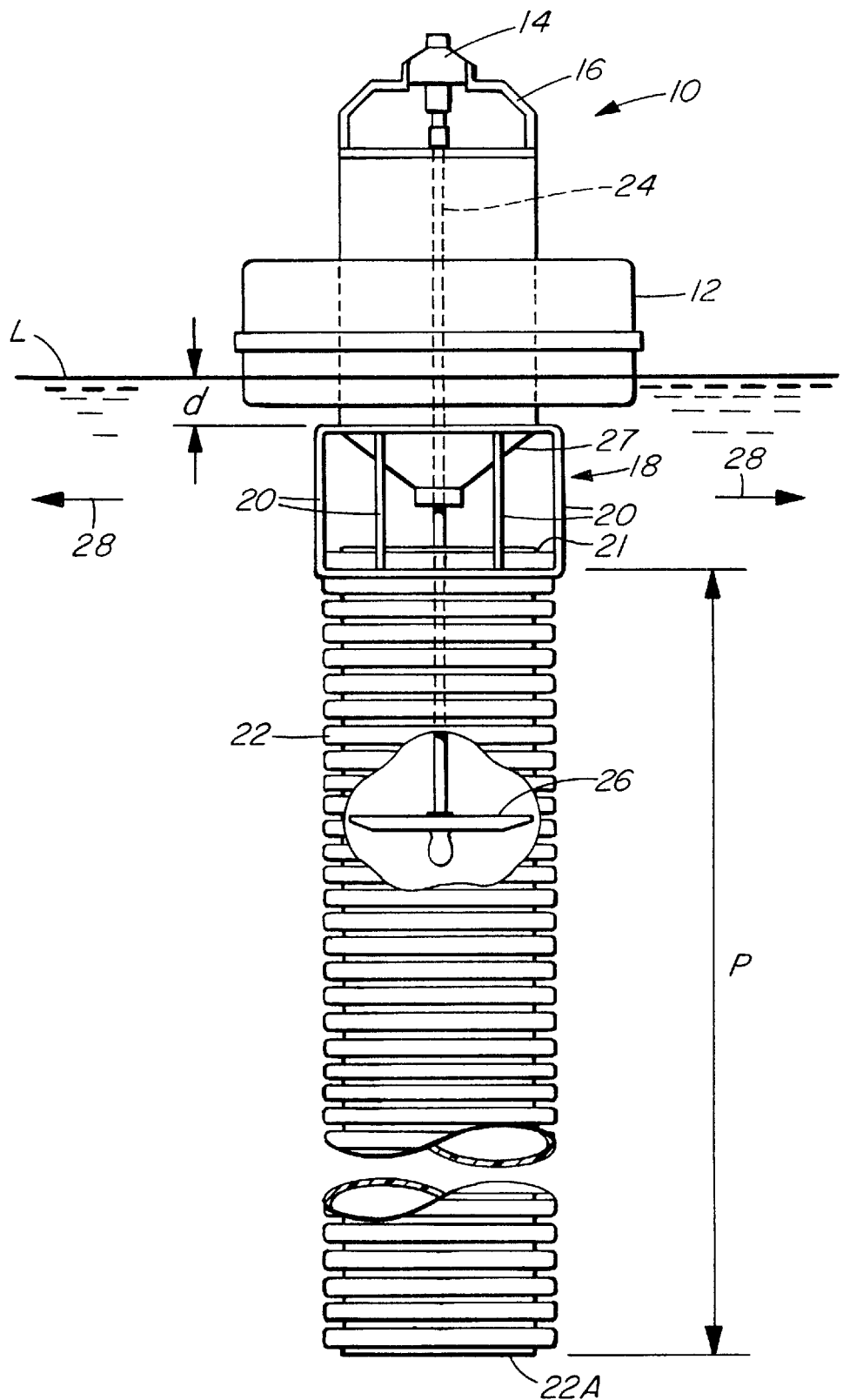
FIG. 1 is a schematic side elevation showing a pumping arrangement for practicing the present invention.

FIG. 1 shows a side elevation of a pumping and dispensing system suitable for the present invention 10. The system 10 illustrated is supported a suitable ring type float 12 that supports a motor such as a hydraulic motor 14 there above on a structure schematically represented at 16 that is connected to and extends above the float 12. The structure 16 also extends below the float 12 and supports an open cage 18 formed by circumferentially spaced rods 20 (4 shown in FIG. 1) that are connected to the upper end of pipe 22. The length D from the level L of the water to the intake end 22A of the pipe 22 which preferably will be in the form of a bell mouth (not shown) tapering to the diameter of the pipe 22 is selected as will be described below to be sufficiently long to receive water from a suitable source.

A drive shaft 24 extends vertically form the motor 14 down through the float 12, structure 16 and cage 18 into and for a distance down the pipe 22 and is connected to and drives a suitable pump impellor schematically indicated at 26 (See U.S. Pat. No. 5,681,146 issued Oct. 28, 1997 to White the teachings of which are incorporated herein by reference for the preferred impellor for use with the invention)

The shaft 24 also passes through and is concentric with an inverted conical deflector 27 that deflects the flow from the top of the pipe from flowing vertically to flowing substantially horizontally and radially out of the cage 18 as schematically represented the arrows 28, Preferably the cone is oriented to direct the flow into the pen to be substantially horizontal across the pen. The sharp edge at the outlet 21 of the pipe 22 around which the flow adjacent to the periphery of the pipe 22 must flow generates turbulence in the water leaving the pipe 22 and this turbulence and the difference in density between the incoming water and the water in the pen produce a downward component of velocity to the incoming water leaving the pipe 22 which will normally be the sole source of the downward component.

The float 12 supports the pipe 22 cage 18 and cone 27 so that the depth d of the top of the cone 27 from the surface L of the water in the pen is generally less than about 500 mm and preferably d will be between 300 and 400 mm.

Figure 2:
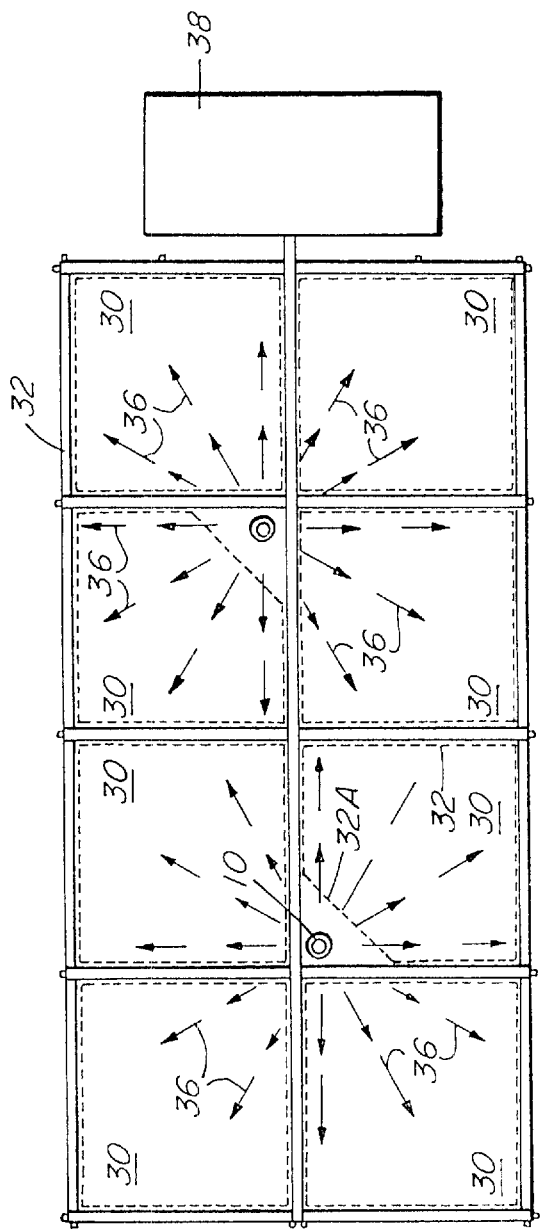
FIG. 2 is a plan view of a layout using a single pumping system to service a plurality of side-by-side pens.
Figure 3:
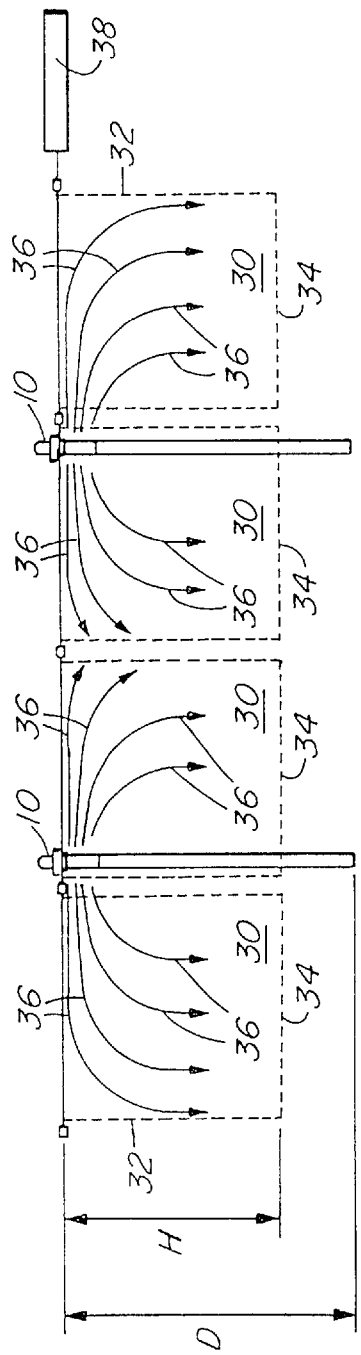
FIG. 3 is a schematic side elevation showing curved velocity vectors showing that the cleaning water has a velocity with a radial component and a downward component.
Figure 4:
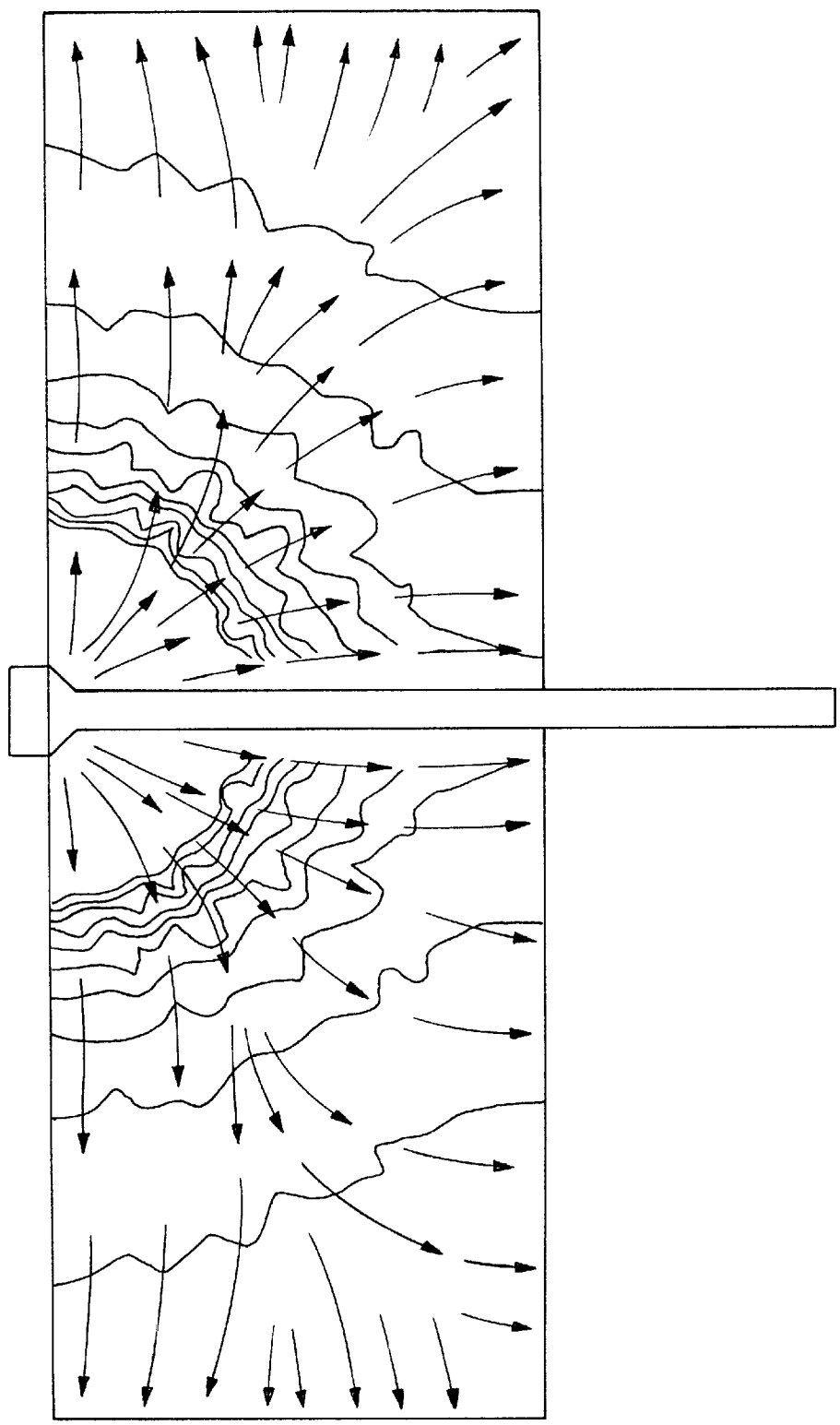
FIG. 4 is a cross section through a pen of a computer simulation showing velocity vectors (direction only) around a pumping system positioned in the center of the pen.

The pumping system 10 may be positioned in the centre of a single pen (as schematically represented in FIG. 4 but more likely a single pumping system 10 will be used to services a plurality of side by side pens such as illustrated in FIGS. 2 and 3. As shown in plan in FIG. 2 a double row of 4 pens each formed with sides 32 and bottoms 34 (see FIG. 3) of netting as represented by the dotted lines. A pair of pumping systems strategically placed in the corners of pens 30 symmetrically positioned on opposite sides of the axial and transverse centre lines of the plurality of pens each directing flow radial in all directions from its outlet as indicated by the arrows 36 i.e. same as the flow represented by the arrows 28 in FIG. 1, however the arrows 36 are also shown in FIG. 3 to show the downward component of the flow of the cleaning water (characteristics of which will be described below) to sweep the plankton from the pens i.e. primarily through the bottoms 34, but some may also flow through the sides 32 of the pens 30. The corners of the two pens in which the pumping systems 10 have been positioned are bevelled off as indicted by the bevelled sidewalls 32A in FIG. 2. Obviously if the pumping system were located inside of a pen for example in the centre of a pen the bottom would be provided with a suitable aperture 9 not shown) to accommodate the pipe 22.

In FIGS. 2 and 3 the service barge for the pens 30 and to which the pens 30 are moored is indicated at 38 and the depth of the bottom of the pens 30 by the height H and the length of the end 22A of the pipe 22 by the distance D.

The sink rate of the cleaning water discharging from the pumping system 10 is substantially solely dependent on the differential density. It is thus an important feature of the invention to ensure that the radial discharge spreads the water out rapidly while preventing the formation of an abrupt downward plume. The term "abrupt downward plume" is intended to describe a plume that extends laterally from the outlet of pipe 22 i.e. from the cage 18 a short distance relative to the size of the pen for example less than 10% of the diameter of the pen and is the water is moving predominantly downward at this spacing from the outlet. The cone 26 directs the flow form the pipe 22 in a manner to obtain a surface plume that extends over a major portion of the area of the surface of the pen 30 that the flow from the pipe 22 is cleaning adjacent to the outlet of the pipe 22, preferably at least 80% of the area of the pen that the flow from the pipe 22.

The distance D is thus selected to provide access to a source of cleaning water having a density significantly higher than the water in the pens in which the plankton is growing so that the cleaning water leaving the pumping system 10 will have a component in the downward direction that is derived primarily form this difference in density, i.e. the downward component is induced primarily by gravity and the depth or distance D should threshold in a position to deliver higher quality water to the upper strata. Generally the toxic algal bloom does not usually extend significantly below the level of light penetration required for photosynthesis. Typically, in cold northern waters, this depth is on the order 10 meters, thus depth D will normally be greater than 10 meters.

Temperature is one factor that determines density but salinity must also considered as it contributes to density that controls the sink rate of the water. Typically, the water at depth D will have higher salinity and lower temperature than in the pen 30.

It is preferred to obtain a discharge in the radial direction of between 1 and 3 meters/second (m/s). In one specific application of he invention the discharge was at about 2 m/s from the cage 18. The flow from the system 10 will generally be 1 and 2 cubic meters per second (m³/s) and in the specific system referred to the flow was 1.5 m³/s.

Figure 1A:
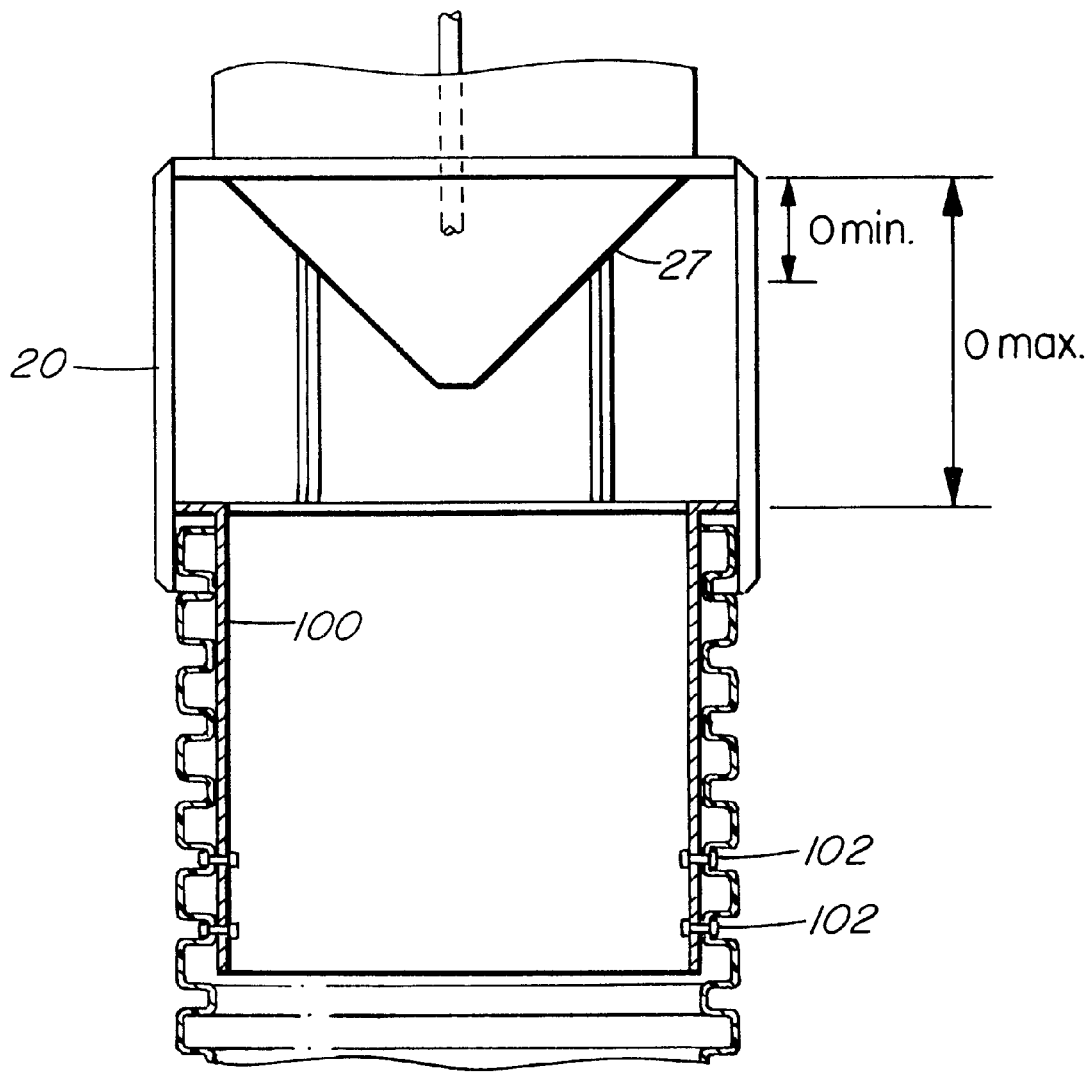
FIG. 1A is a section through the top end of the pipe showing the adjustment sleeve fixed in maximum open position.

The pumping system 10 should be able to adjust both the flow rate and the discharge velocity. The flow rate is adjusted by a changing the pump impellor 26 rpm and the discharge velocity is adjusted by a sliding sleeve 100 (see FIG. 1A) which is mounted in the pipe 22 by suitable bolts 102 that may be removed and the position of the sleeve changed by moving axially of the pipe to restrict the discharge area between the cone 26 and the top edge 21 of the pipe 22 i.e. the top edge of the sleeve becomes equivalent to the edge 21. The sleeve 100 may be moved to provide a maximum outlet size as indicated at $O_{max}$ and a minimum outlet size as indicated at $O_{min}$ (see FIG. 1A) This permits adjustment for both different pen sizes and different density regimes.

Typical net-pens 30 are 10 meters deep i.e. distance H generally equals about 10 meters. Ideally, one would want the sink rate of the water to be equal to that depth H divided by the time it takes the water to move radially out from the pump 10 to the farthest edge 32 of the pen. Since it is difficult to know the sink rate in practice, the operator will adjust the discharge velocity until the desired lowering of cell count occurs at the side 32. Assuming the velocity profile across the pen follows the distance square law one can estimate at transit time.

The best rule of thumb is to measure the plankton concentration and adjust accordingly. In practical terms one would set the flow rate to supply the desired amount of water to meet the fish's oxygen needs, as established by measuring oxygen ($O_2$) in the pens, and then adjust the velocity of discharge until the plankton levels were acceptable. In real world situations, given that this is an emergency device, it is believed the operator will likely pump as much water as possible and not bother with the details.

The purpose of this device is to provide water, which is superior in quality than that at the surface; to fish raised in a floating pen by lifting said water from a depth where it occurs and distributing it into the pen.

To prevent incursion of the undesirable surface water the pens may be enclosed with a tarp (commonly used to prevent such incursion) forming a barrier. This modifies the dispersion pattern by redirecting the outward flow downwards and may improve the effective dilution of the toxic algae.

As above indicated the pumping system 10 may also be positioned in the center of a pen 30 discharging outwards. A significant advantage of this approach is that the discharge is not required to traverse a net barrier in order to reach the fish. The drawback is that it would be more difficult to install during an emergency.

FIG. 4 is a computer-generated model of a system constructed according to the present invention showing eh velocity vector through one slice through a pen 30 with the pumping system 10 in the center profile Velocities in the diagram of FIG. 4 range from a high of 2 m/s within the pump tube 22 to a low of few millimetres per second at the far pen wall 32.

Figure 5:
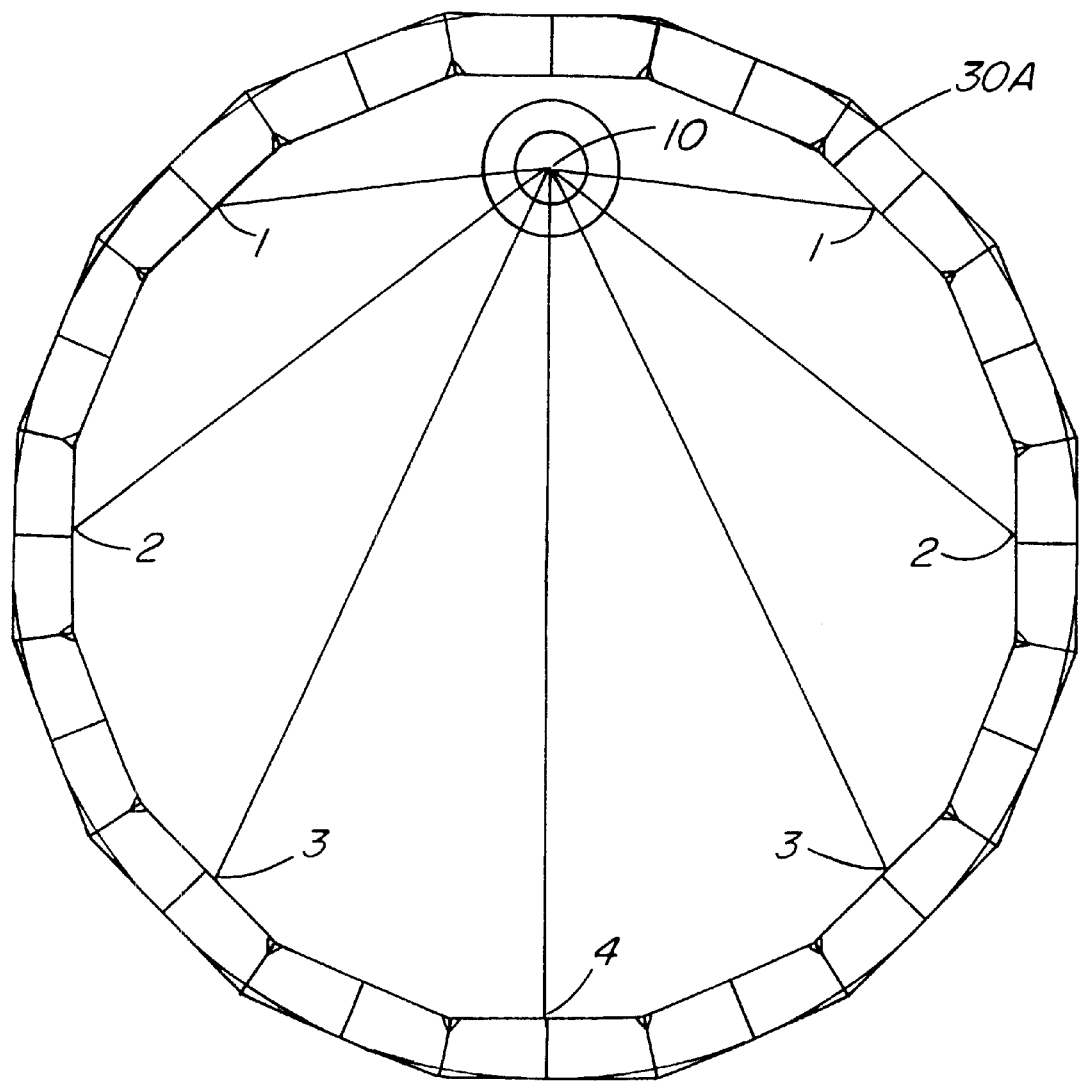
FIG. 5 is a plan view illustrating the layout used to actually measure water velocity at different distances from the pumping system and at different depths

FIG. 5 shows the locations relative to the pumping system 10 where various water velocity measurements were made in a test to determine the effectiveness of the system. As shown the pumping system 10 was located adjacent to the periphery at one side of a circular pen 30A and velocities were measured at circumferentially spaced locations 1, 2, 3, and 4 on the periphery of the pen 30A location with the same identifying number are spaced the same distance from eh pumping system 10 but are positioned on opposite sides of the pen. Table 1 presents the results of these tests using averages of the readings at each of the points.

TABLE 1

| Location | Distance to Pump 10 meters(m) | Depth d 0 cm Velocity* m/second | Depth d 30 cm Velocity* m/second | Depth d 1 m Velocity* m/second | Depth d 2 m Velocity* m/second | Depth d 3 m Velocity* m/second |
| --- | --- | --- | --- | --- | --- | --- |
| 1 | 4.5 | 0.41 | 0.27 | 0.04 | 0.04 | 0.04 |
| 2 | 8.2 | 0.29 | 0.21 | 0.03 | 0.02 | 0.03 |
| 3 | 10.7 | 0.24 | 0.14 | 0.05 | 0.03 | 0.02 |
| 4 | 11.5 | 0.2 | 0.12 | 0.04 | 0.03 | 0.02 |

• *Radial velocity - average of three readings

By averaging the readings from opposite sides pen 30A compensated for the effect of the tidal currents at the site where the tests were conducted. These measured values confirmed that the computer model was accurate to the extent required.

Flow dispersion tests were also conducted using rhodamine dye to monitor flow patterns from the pump and to simulate a plankton effect. Observations were conducted during the tests by personal at the water surface, and by scuba divers at a depth of 10 meteres. Observations verified earlier velocity measurements and proved that flow penetration occurred to the desired depth of 10 meters. The movement of the dye simulates the expected movement of the plankton and confirmed that the plankton will be displaced from the pen when the present invention is applied Having described the invention modifications will be evident to those skilled in the art without departing from the spirit of the invention as defined in the appended claims.

What is claimed is:

1. A method of removing plankton from a fish pen comprising pumping a cleaning water from a depth to provide a source of cleaning water having a density higher than the water density of water in said pen, said pumping delivering a flow of said higher density cleaning water through a pipe to a location within said pen, directing said flow from said pipe to form a surface plume of and to distribute said higher density water latterly across at least a major portion of the area of said pen while permitting at least a portion of said higher density water to sink toward a bottom of said pen and carry plankton with it and dispensing said plankton carried to said bottom by said cleaning water from said pen.

2. A method of removing plankton from a fish pen as defined in claim 1 wherein said directing directs said cleaning water to flow substantially radially from said pipe without formation of an abrupt downward plume of water at said outlet.

3. A method of removing plankton from a fish pen as defined in claim 2 wherein said surface plume extends over a major portion of the area of the surface of said pen.

4. A method of removing plankton from a fish pen as defined in claim 3 wherein said pumping dispenses said cleaning water at a flow rate of between 1 and 2 cubic meters/second.

5. A method of removing plankton from a fish pen as defined in claim 4 wherein said pumping dispenses said cleaning water at a velocity having a component radially of said outlet of between 1 and 3 meters/second.

6. A method of removing plankton from a fish pen as defined in claim 5 wherein said cleaning water in said pen has a downward velocity obtained substantially solely based on turbulence and difference in density between said cleaning water and said water in said pen.

7. A method of removing plankton from a fish pen as defined in claim 4 wherein said cleaning water in said pen has a downward velocity obtained substantially solely based on turbulence and the difference in density between said cleaning water and said water in said pen.

8. A method of removing plankton from a fish pen as defined in claim 3 wherein said pumping dispenses said cleaning water at a velocity having a component radially of said outlet of between 1 and 3 meters/second.

9. A method of removing plankton from a fish pen as defined in claim 8 wherein said cleaning water in said pen has a downward velocity obtained substantially solely based on turbulence and difference in density between said cleaning water and said water in said pen.

10. A method of removing plankton from a fish pen as defined in claim 3 wherein said cleaning water in said pen has a downward velocity obtained substantially solely based on turbulence and difference in density between said cleaning water and said water in said pen.

11. A method of removing plankton from a fish pen as defined in claim 2 wherein said pumping dispenses said cleaning water at a flow rate of between 1 and 2 cubic meters/second.

12. A method of removing plankton from a fish pen as defined in claim 11 wherein said pumping dispenses said cleaning water at a velocity having a component radially of said outlet of between 1 and 3 meters/second.

13. A method of removing plankton from a fish pen as defined in claim 12 wherein said cleaning water in said pen has a downward velocity obtained substantially solely based on turbulence and difference in density between said cleaning water and said water in said pen.

14. A method of removing plankton from a fish pen as defined in claim 11 wherein said cleaning water in said pen has a downward velocity obtained substantially solely based on turbulence and the difference in density between said cleaning water and said water in said pen.

15. A method of removing plankton from a fish pen as defined in claim 2 wherein said pumping dispenses said cleaning water at a velocity having a component radially of said outlet of between 1 and 3 meters/second.

16. A method of removing plankton from a fish pen as defined in claim 15 wherein said cleaning water in said pen has a downward velocity obtained substantially solely based on turbulence and difference in density between said cleaning water and said water in said pen.

17. A method of removing plankton from a fish pen as defined in claim 2 wherein said cleaning water in said pen has a downward velocity obtained substantially solely based on turbulence and the difference in density between said cleaning water and said water in said pen.

18. A method of removing plankton from a fish pen as defined in claim 1 wherein said pumping dispenses said cleaning water at a flow rate of between 1 and 2 cubic meters/second.

19. A method of removing plankton from a fish pen as defined in claim 18 wherein said pumping dispenses said cleaning water at a velocity having a component radially of said outlet of between 1 and 3 meters/second.

20. A method of removing plankton from a fish pen as defined in claim 19 wherein said cleaning water in said pen has a downward velocity obtained substantially solely based on turbulence and difference in density between said cleaning water and said water in said pen.

21. A method of removing plankton from a fish pen as defined in claim 18 wherein said cleaning water in said pen has a downward velocity obtained substantially solely based on turbulence and difference in density between said cleaning water and said water in said pen.

22. A method of removing plankton from a fish pen as defined in claim 1 wherein said pumping dispenses said cleaning water at a velocity having a component radially of said outlet of between 1 and 3 meters/second.

23. A method of removing plankton from a fish pen as defined in claim 22 wherein said cleaning water in said pen has a downward velocity obtained substantially solely based on turbulence and difference in density between said cleaning water and said water in said pen.

24. A method of removing plankton from a fish pen as defined in claim 1 wherein said cleaning water in said pen has a downward velocity obtained substantially solely based on turbulence and the difference in density between said cleaning water and said water in said pen.

* * * * *